US008656216B2

(12) United States Patent
Shigehara

(10) Patent No.: US 8,656,216 B2
(45) Date of Patent: Feb. 18, 2014

(54) FAILURE DIAGNOSTIC SYSTEM, ELECTRONIC CONTROL UNIT FOR VEHICLE, FAILURE DIAGNOSTIC METHOD

(75) Inventor: Eiichiro Shigehara, Nissin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 326 days.

(21) Appl. No.: 13/257,121

(22) PCT Filed: Feb. 2, 2010

(86) PCT No.: PCT/IB2010/000195
§ 371 (c)(1),
(2), (4) Date: Sep. 16, 2011

(87) PCT Pub. No.: WO2010/106403
PCT Pub. Date: Sep. 23, 2010

(65) Prior Publication Data
US 2012/0005535 A1 Jan. 5, 2012

(30) Foreign Application Priority Data

Mar. 17, 2009 (JP) .................................. 2009-064975

(51) Int. Cl.
*G06F 11/00* (2006.01)
(52) U.S. Cl.
USPC ................................. 714/10; 714/12; 714/25
(58) Field of Classification Search
USPC .............................................. 714/10, 12, 25
See application file for complete search history.

(56) References Cited

U.S. PATENT DOCUMENTS

| 5,682,491 | A  | * | 10/1997 | Pechanek et al. | ............. | 712/209 |
| 8,448,162 | B2 | * | 5/2013  | Ramanathan et al. | ........ | 717/171 |
| 2005/0166089 | A1 |   | 7/2005  | Ito et al. |  |  |
| 2006/0230139 | A1 |   | 10/2006 | Locke |  |  |
| 2007/0220516 | A1 |   | 9/2007  | Ishiguro et al. |  |  |
| 2007/0271570 | A1 | * | 11/2007 | Brown et al. | .................. | 718/105 |
| 2008/0091974 | A1 | * | 4/2008  | Nakashima | ..................... | 714/10 |
| 2008/0098262 | A1 | * | 4/2008  | Ford et al. | ........................ | 714/25 |
| 2010/0242014 | A1 | * | 9/2010  | Zhu | ............................... | 717/106 |

FOREIGN PATENT DOCUMENTS

| EP | 1 602 935 A1 | 12/2005 |
| JP | 62-286131 A | 12/1987 |
| JP | 07-230392 A | 8/1995 |
| JP | 2007-249491 A | 9/2007 |
| JP | 2008-097280 A | 4/2008 |
| JP | 2008-123439 A | 5/2008 |
| WO | 2008/050076 A1 | 5/2008 |

OTHER PUBLICATIONS

International Search Report and Written Opinion for corresponding International Patent Application No. PCT/IB2010/000195 mailed Jun. 7, 2010.
International Preliminary Report on Patentability for corresponding International Patent Application No. PCT/IB2010/000195 completed Jun. 14, 2011.
Partial translation of Japanese Office Action for corresponding Patent Application No. JP 2009-064975 issued on Mar. 26, 2013.

* cited by examiner

*Primary Examiner* — Charles Ehne
(74) *Attorney, Agent, or Firm* — Sughrue Mion, PLLC

(57) ABSTRACT

A failure diagnostic system (100) for a multicore CPU having installed therein a plurality of CPU cores (11) that is configured to be switched from a SMP mode to an AMP mode includes: load prediction means for predicting a processing load of the multicore CPU; mode switching means for switching at least one of the CPU cores (11) to the AMP mode when the processing load is less than a threshold; and failure diagnostic means for performing a failure diagnosis of the CPU core that has been switched to the AMP mode.

15 Claims, 15 Drawing Sheets

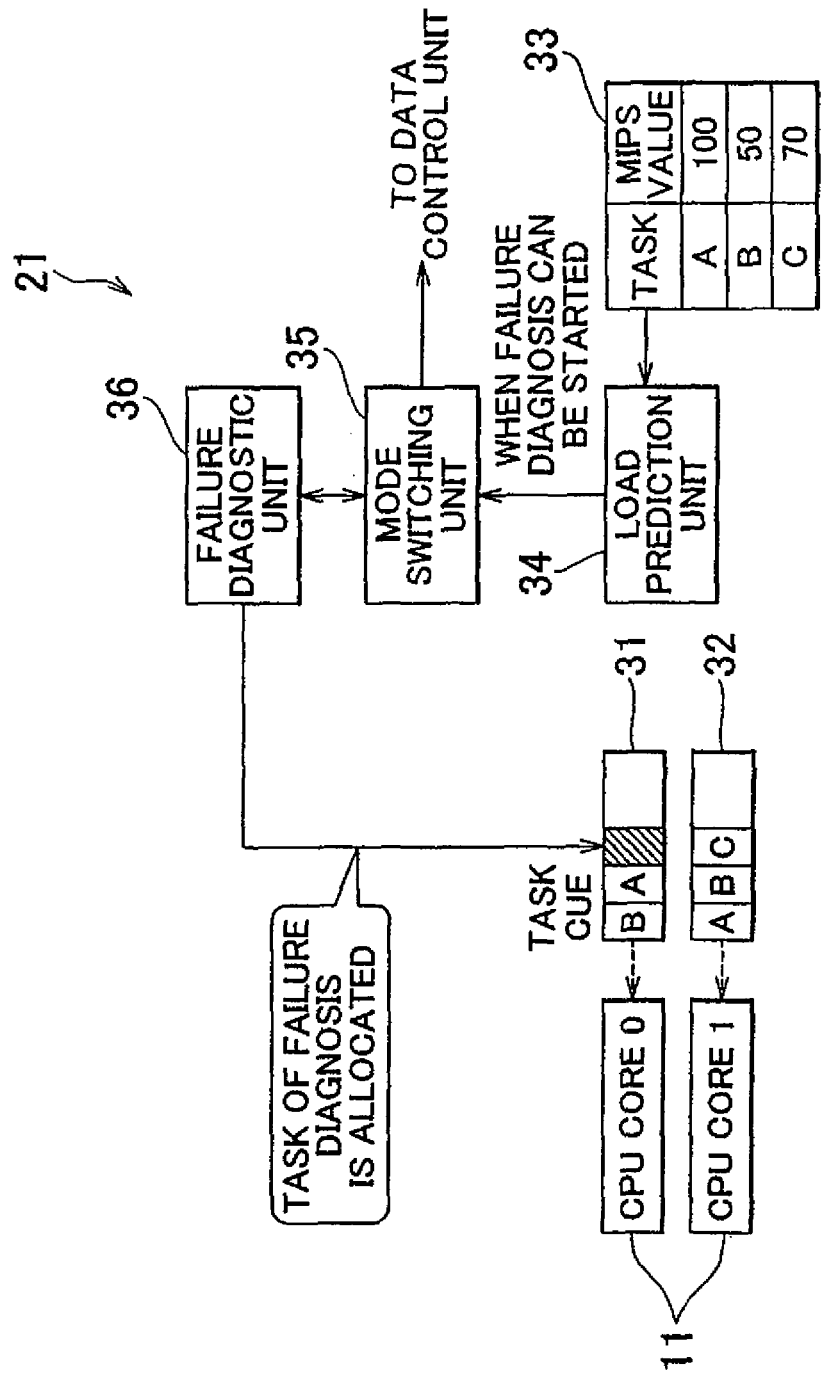

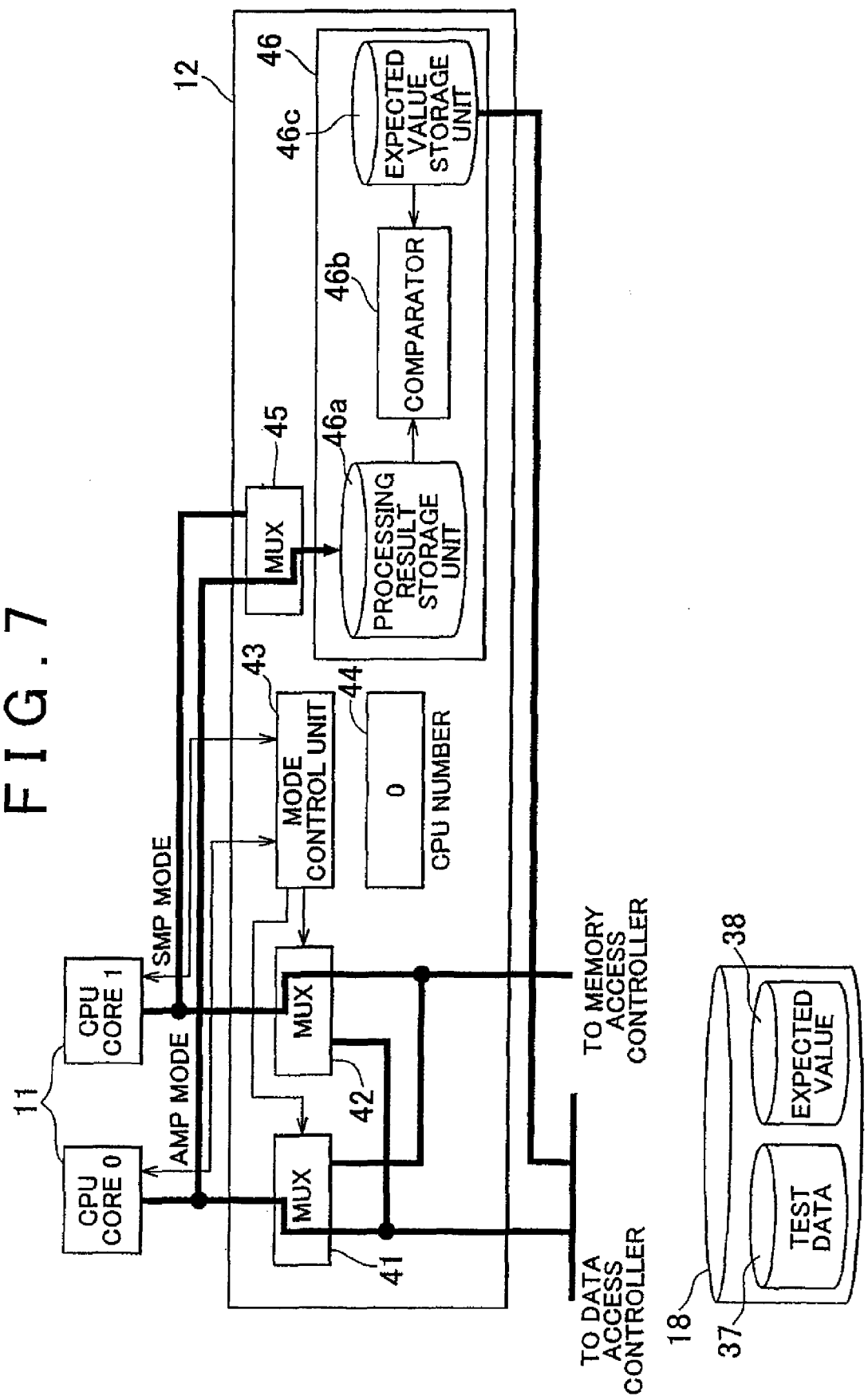

FAILURE DIAGNOSTIC SYSTEM, ELECTRONIC CONTROL UNIT FOR VEHICLE, FAILURE DIAGNOSTIC METHOD

BACKGROUND OF THE INVENTION

1. Field of the Invention

The invention relates to a failure diagnostic system for a multicore central processing unit (CPU) that is provided with a plurality of CPU cores, and more particularly to a failure diagnostic system that performs a failure diagnosis of each CPU core individually, an electronic control unit (ECU) for a vehicle, and a failure diagnostic method.

2. Description of the Related Art

Mutual abnormality detection is sometimes conducted by detecting abnormality in a LSI or microcomputer by using a configuration in which a plurality of LSI or microcomputers are installed in one system and monitoring a watchdog signal transmitted from one large scale integration (LSI) (microcomputer) to another LSI (microcomputer). Further, in a multicore processor in which one microcomputer carries a plurality of CPU cores, an abnormality is detected by executing the same processing in a plurality of CPU and comparing the processing results. Further, Japanese Patent Application Publication No. 7-230392 (JP-A-7-230392) discloses a method by which a CPU detects abnormality by self-diagnosis.

FIG. 14 is a block-diagram of a processor that conducts self-diagnosis according to JP-A-7-230392. An instruction code generation unit generates an instruction intrinsic code according to an established rule and inputs the code in a code comparison unit. An execution instruction code generation unit generates an instruction intrinsic code according to a rule inverted with respect to that of the instruction code generation unit and inputs the generated instruction intrinsic code into the code comparison unit 4. The code comparison unit compares the two instruction intrinsic codes and detects a failure in the processor if the codes differ from each other.

However, executing the same processing in a plurality of CPU or executing a certain instruction for abnormality detection, as shown in FIG. 14, may put pressure upon resources of the microcomputer or processor, thereby affecting the execution speed of standard processing (reducing the execution speed of standard processing with respect to the usual one) such as control or data processing that is essentially required for the processor.

A conventional multicore processor has a processing mode that is Symmetric Multi-Processing (or called as SMP), a processing mode that is Asymmetric Multiprocessing (or called as AMP), and a processing mode that is Bound Multiprocessing (or called as BMP) combining the SMP and AMP. Further, for example, Japanese Patent Application Publication No. 2008-123439 (JP-A-2008-123439) discloses a processor configured for the BMP mode, wherein when an abnormality occurs in any CPU core, the processing allocated to the CPU core in which the abnormality has occurred is allocated to another CPU core. With the operating system (OS) disclosed in the JP-A-2008-123439, when the processing is allocated to another core, the processing with a high priority order is allocated to a normal CPU and the processing with a low priority order is not performed, thereby making it possible to execute the processing with a high priority order with the same efficiency as that before the abnormality has been detected.

However, the OS disclosed in the JP-A-2008-123439 is not different from that disclosed in JP-A-7-230392 in that a pressure is put upon the resources of microcomputer or processor, for example, a "1+1" addition" is performed by a CPU core, when an abnormality is detected and, therefore, the execution speed of standard processing may be affected.

SUMMARY OF THE INVENTION

The invention provides a failure diagnostic system that may specify a CPU core in which an abnormality has occurred from among a plurality of CPU cores, without affecting the execution speed of standard processing, and also an ECU for a vehicle and a failure diagnostic method.

The first aspect of the invention relates to a failure diagnostic system for a multicore CPU having installed therein a plurality of CPU cores that is configured to be switched from a SMP mode to an AMP mode, the system including: load prediction means for predicting a processing load of the multicore CPU; mode switching means for switching at least one of the CPU cores to the AMP mode when the processing load is less than a threshold; and failure diagnostic means for performing failure diagnosis of the CPU core that has been switched to the AMP mode.

In the failure diagnostic system according to the first aspect, the load prediction means may predict a processing load of the multicore CPU in a period required for the failure diagnostic means to conduct failure diagnosis.

Further, in the failure diagnostic system according to the first aspect, the load prediction means may establish the period that is started at a point of time in which a task executed by the CPU core to be switched to the AMP mode ends.

Further, the failure diagnostic system according to the first aspect may further include a first data bus dedicated to the CPU core in the SMP mode; a second data bus dedicated to the CPU core in the AMP mode; and data control means for connecting the CPU core in the SMP mode to the first data bus and connecting the CPU core in the AMP mode to the second data bus.

Further, in the failure diagnostic system according to the first aspect, the data control means may have a plurality of multiplexor units connected to a plurality of the CPU cores respectively; and the mode switching means may switch a connection destination of the multiplexor unit connected to the CPU core that has been switched to the AMP mode from the first data bus to the second data bus.

Further, in the failure diagnostic system according to the first aspect, the failure diagnostic means compares a processing results of test data for failure diagnosis with an expected value that has been stored in advance, and conduct failure diagnosis of the CPU core that has been switched to the AMP mode based on whether the processing results and the expected value are in conformity.

Further, the failure diagnostic system according to the first aspect may further include an external memory that stores the test data and the expected value, wherein the failure diagnostic means may read the test data and the expected value via the second data bus.

Further, in the failure diagnostic system according to the first aspect, a result of the comparison between the processing result of the test data and the expected value may be stored in the external memory.

Further, in the failure diagnostic system according to the first aspect, the data control means may store the test data and the expected value.

Further, in the failure diagnostic system according to the first aspect, when the failure diagnostic means detects a failure of the CPU core, the CPU core may be disconnected from the multicore CPU and tasks are distributed only to the remaining CPU cores that have not been diagnosed as having failed.

Further, in the failure diagnostic system according to the first aspect, the threshold of a processing load may be set to a value such that the processing capacity of standard processing in the CPU core in the SMP mode does not decrease when the CPU core switched to the AMP mode undergoes failure diagnosis.

Further, in the failure diagnostic system according to the first aspect, the standard processing may be a processing that requires real time execution ability.

Further, the failure diagnostic system according to the first aspect may further include storage means for storing as information a time at which failure diagnosis has been performed, wherein the failure diagnosis may be conducted again in a case where a time elapsed since the last failure diagnosis exceeds a predetermined time.

An ECU for a vehicle according to the second aspect of the invention includes the failure diagnostic system according to the first aspect; navigation means; video output means; and audio output means.

The third aspect of the invention relates to a failure diagnostic method for a multicore CPU having installed therein a plurality of CPU cores that is configured to be switched from a SMP mode to an AMP mode, the method including: predicting a processing load of the multicore CPU; switching at least one of the CPU cores to the AMP mode when the processing load is less than a threshold; and performing failure diagnosis of the CPU core that has been switched to the AMP mode.

The invention may provide a failure diagnostic system that may specify a CPU core in which an abnormality has occurred from among a plurality of CPU cores, without affecting the execution speed of standard processing, and also an ECU for a vehicle and a failure diagnostic method.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements, and wherein:

FIG. 5 is illustrates an example of a functional block provided by the OS according to the second embodiment of the invention;

FIG. 7 shows a data control unit immediately after the mode switching unit according to the second embodiment of the invention has outputted a control signal to the mode control unit;

DETAILED DESCRIPTION OF EMBODIMENTS

Embodiments of the invention will be explained below with reference to the appended drawings.

Figure 1:
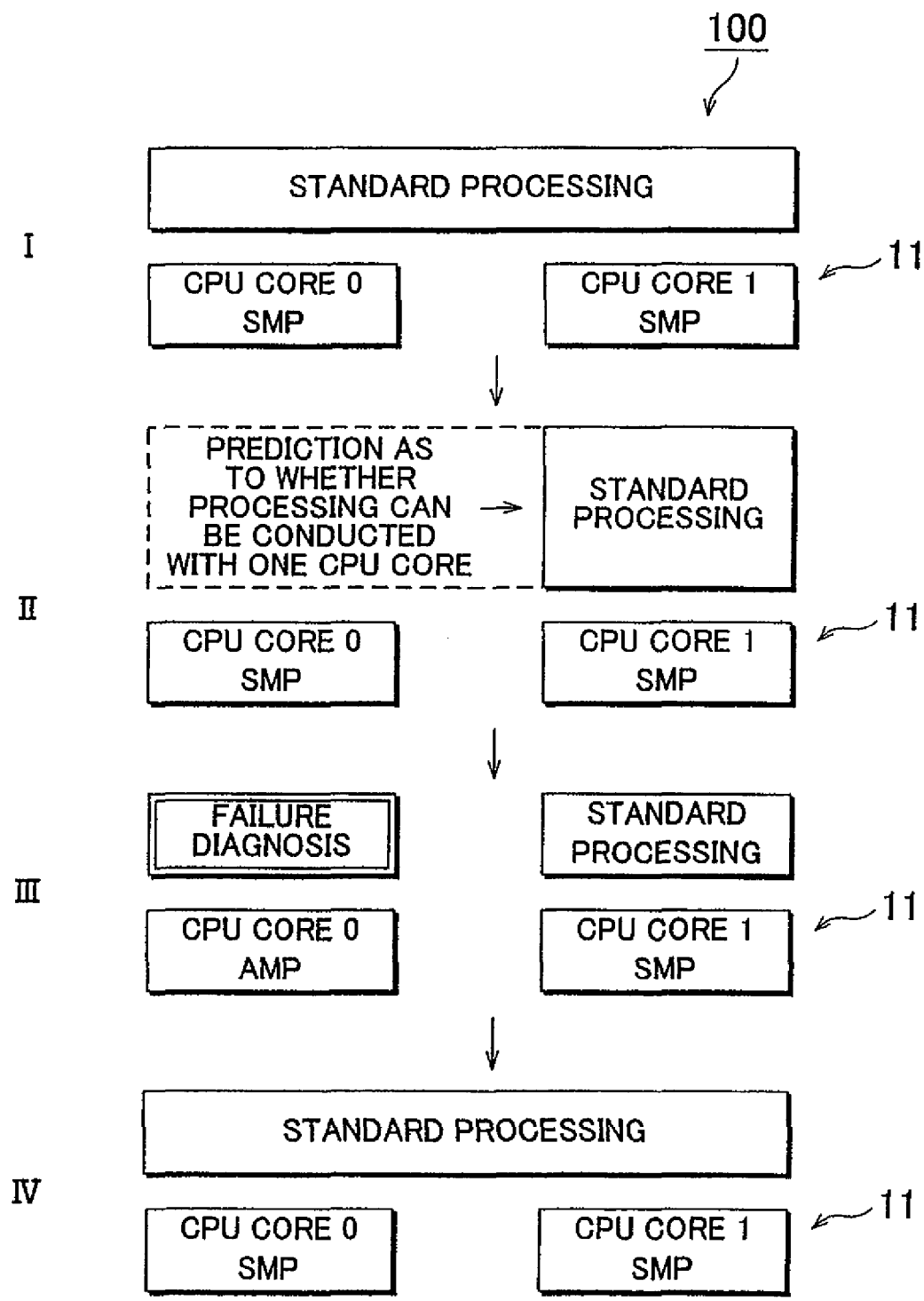
FIG. 1 is an example drawing illustrating schematically failure diagnosis of a microcomputer according to the first embodiment of the invention.
Figure 2:
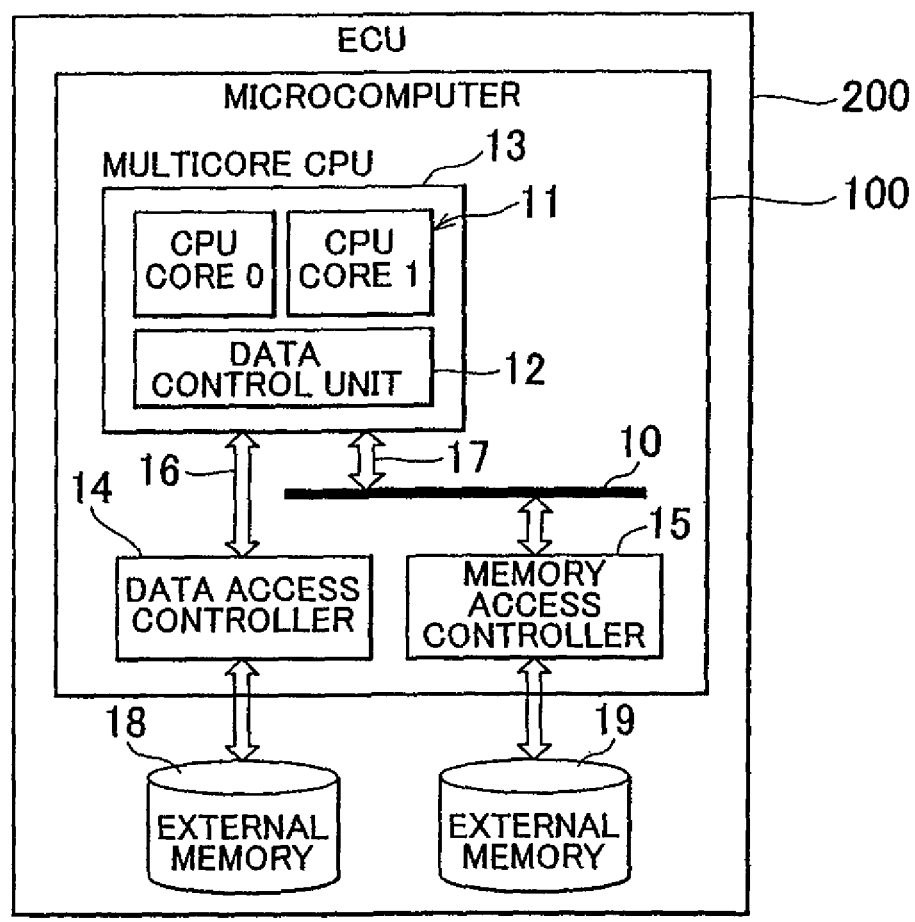
FIG. 2 illustrates an example of a block diagram of the microcomputer that carries a multicore CPU according to the first and second embodiments of the invention.
Figure 3:
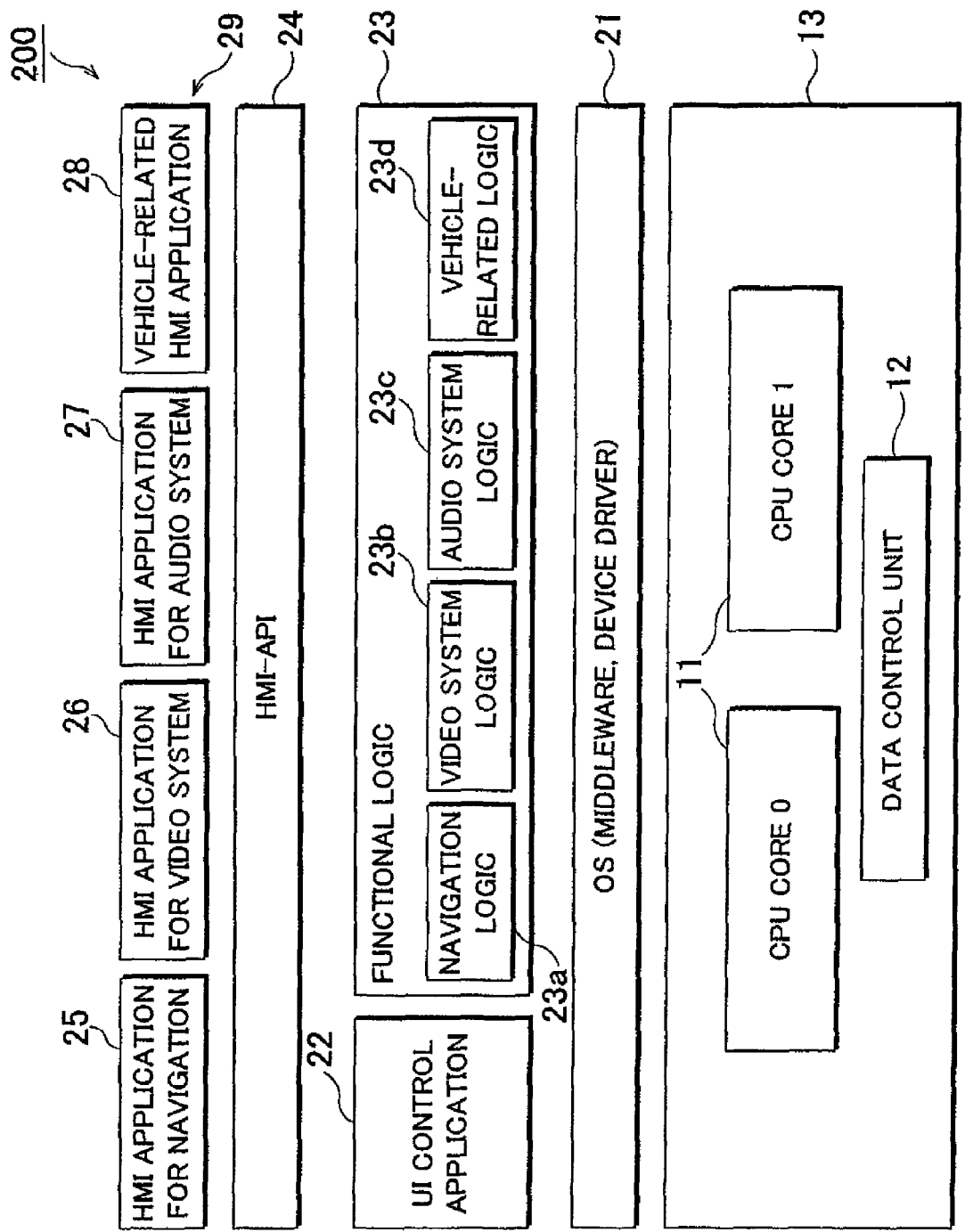
FIG. 3 illustrates an example of system layers of an ECU according to the first and second embodiments of the invention.

A first embodiment will initially be explained. FIG. 1 is an example drawing illustrating schematically failure diagnosis of a microcomputer 100 according to the first embodiment of the invention. FIG. 2 illustrates an example of a block diagram of the microcomputer that carries a multicore CPU according to the first and second embodiments of the invention. FIG. 3 illustrates an example of system layout of an ECU according to the first and second embodiments of the invention. The microcomputer 100 has a CPU core 0 and a CPU core 1. (As shown in FIG. 2, in a case where the CPU core 0 and CPU core 1 are not distinguished, this is called a CPU core 11, while one system constituted by the CPU core 0 and CPU core 1 is called a multicore CPU 13). An OS 21 that is installed in the microcomputer 100 may switch the CPU core 0 and CPU core 1 individually between SMP (Symmetric Multi-Processing) and AMP (Asymmetric Multiprocessing) processing modes (the SMP processing mode and AMP processing mode will be referred to hereinbelow as "SMP mode" and "AMP mode", respectively). Thus, the processing efficiency is increased where the OS 21 and CPU cores 11 are switched dynamically (temporarily when failure diagnosis is performed) from the SMP mode to a BMP processing mode, instead of operating in a complete BMP process.

The SMP mode is generally a processing mode in which one OS 21 has the CPU core 0, CPU core 1, and one memory, and the OS 21 dynamically allocates the tasks to the CPU core 11 with a small processing load. Thus, there is no connection between the task and CPU core 11, and from the standpoint of OS 21, the CPU cores are equivalent. The AMP mode is generally a processing mode in which the tasks allocated to the CPU core 11 are determined in advance. In this mode, even if the processing load of a certain CPU core 11 is small, the task that is an object of execution may not be executed by the CPU core 11 with a small processing load unless the task that is an object of execution is the task that has been allocated to this CPU core 11. Further, the BMP mode is a processing mode in which one OS 21 allocates a specific task to a specific CPU core and other tasks are dynamically allocated to the remaining CPU core.

Referring to FIG. 1, the CPU core 0 and CPU core 1 initially execute the standard processing in the SMP mode ("I" in FIG. 1). The standard processing is control or data processing that is requested at all times for the CPU cores 11 based on the operations conducted by the vehicle driver, travel state of the vehicle, or vehicle state, in other words, the processing other than a task of detecting a failure. The standard processing is typically constituted by a plurality of different tasks.

At a timing of failure diagnosis of the CPU core 0, the OS 21 checks that no effect will be produced on the execution speed of standard processing (that the processing load is below the threshold) even when only the CPU core 1 will execute the standard processing, before switching the CPU core 0 from the SMP mode to the AMP mode ("II" in FIG. 1). As a result, the standard processing may be ensured to be executed without delays even when the CPU core 0 is in the AMP mode and executes only a task of failure diagnosis when failure diagnosis is conducted.

The OS 21 switches the CPU core (in this case, CPU core 0) 11 that is the object of failure diagnosis from the SMP mode to the AMP mode. The special task executed by the CPU core 0 in the AMP mode is the failure diagnostic task. The CPU core 0 in the AMP mode does not execute any task other than the failure diagnostic task. By contrast, the CPU core 1 remains in the SMP mode, and the CPU core 1 continues the standard processing ("III" in FIG. 1).

Once the CPU core 0 completes the failure diagnostic task, the OS 21 switches the CPU core 0 from the AMP mode to the SMP mode ("IV" in FIG. 1).

Further, at a timing of failure diagnosis of the CPU core 1, the OS 21 switches the CPU core 1 from the SMP mode to the AMP mode and allocates the failure diagnostic task to the CPU core 1 in a procedure similar to the failure diagnosis of the CPU core 0 shown in FIG. 1.

By installing a multicore CPU 13 and OS 21 that may be switched between the SMP mode and AMP mode and checking before the switching as to whether the processing load is such that the standard processing may be conducted without delays by one CPU core 11, it is possible to conduct individual failure diagnosis of each CPU core 11 of the multicore CPU 13, without affecting the execution speed of standard processing.

The second embodiment will be explained below. In FIG. 2, a microcomputer 100 has the multicore CPU 13, a data access controller 14, a memory access controller 15, and data buses 16, 17. The multicore CPU 13 has a CPU core 0, a CPU core 1, and a data control unit 12. The data access controller 14 is connected to an external memory 18, and the memory access controller 15 is connected to the external memory 19. The multicore CPU 13 may be installed at an LSI, rather than the microcomputer 100.

An Electronic Control Unit (ECU) 200 installed at a vehicle may be realized by the microcomputer 100, external memory 18, and external memory 19. For example, in the ECU 200 of a multimedia system, the processing of displaying a road map on a display device on the basis of position information detected by a global positioning system (GPS) receiver and searching a route to the destination, video processing of television or camera images, and voice processing or radio or CD player are the examples of standard processing. In the engine ECU, the standard processing is a processing of adequately controlling the fuel injection amount, fuel injection timing, opening-closing timing of intake and exhaust valves, throttle opening degree, and ignition timing of an igniter. Further, the installation at a body ECU, brake ECU, and various ECU 200 for assisting driving is also possible. In the embodiment, failure diagnosis is conducted without affecting the execution speed of these kinds of standard processing. Therefore, a processing that requires real time execution ability may be also defined as the standard processing.

The data control unit 12 controls CPU communication between the CPU core 0 and CPU core 1. A function of notifying the state of CPU core 11 at each cycle time and a function of transmitting and receiving data between the CPU core 0 and CPU core 1 via a shared memory may be considered as typical functions of CPU communication. For example, in a case where the two CPU cores 11 execute the same application and use the mutually obtained processing results, the data control unit 12 checks the compatibility of processing results. Further, the CPU core 11 may interrupt the CPU core 1 from the CPU core 0 (and conversely) by using the prepared Application Programming Interface (API) and sending a request to the data control unit 12.

The data bus 17 is a bus that is used by the CPU core 11 during standard processing. The data bus 16 is a bus that is used by the CPU core 11 during failure diagnosis. At a failure diagnostic timing, the data control unit 12 causes the CPU core 11 to access the external memory 18 via the data bus 16. For example, because the CPU core 1 conducts standard processing even when the CPU core 0 executes a task of failure diagnosis, by providing separately the data bus 17 that is used during standard processing and the data bus 16 that is used during failure diagnosis, it is possible to increase a bus load of the data bus 17 during failure diagnosis and prevent any effect on the execution speed of standard processing.

The data access controller 14 accesses the external memory 18 in response to a request from the data control unit 12 during failure diagnosis and reads the below-described test data and expected value.

The external memory 19 is a memory device of a comparatively large capacity (for example, Hard Drive Disk (HDD) or Solid State Disk (SSD)) that stores the application programs, OS 21, and files necessary for the standard processing. The data control unit 12 sends an access request of the CPU core 11 that is executing the standard processing to the memory access controller 15 via the data bus 17.

Various kinds of Intellectual Property (IP) (not shown in the figure) are connected to the bus 10. These IP are an Integrated Circuit (IC) such as a power circuit, an I/O interface circuit, a Control Area Network (CAN) communication circuit, and a motor control circuit. In a case where the microcomputer 100 is installed at the ECU 200 of a multimedia system, IC such as a radio tuner, a television tuner, an AV decoder, a sound recognition/synthesizing circuit, a Bluetooth circuit, and a touch panel sensor circuit are the IP. The IP of an audio system are connected to speakers via an amplifier, and the IP of a video system are connected to a display.

FIG. 3 shows an example of system layers of the ECU 200. Thus, FIG. 3 shows system layers in which the microcomputer 100 is installed at the ECU 200 of a multimedia system. The layer that is the closest to the multicore CPU 13 is a layer of the OS 21. The layer of the OS 21 actually includes middleware that provides a device driver and virtual execution environment for controlling an actuator and executes specific computations such as protocol processing or data compression and expansion. In the embodiment, the OS 21 controls the operation of switching the CPU core 11 from the SMP mode to the AMP mode.

The layer above the OS 21 is a layer of a User Interface (UI) control application 22 and a functional logic 23. The UI control application 22 controls the UI that is displayed on a display by the ECU 200 of a multimedia system. The uppermost layer, as shown in the figure, is a UI application 29 for various functions that control the UI to make it visible to the user. A Human-machine Interface (HMI) application 25 for navigation generates a UI relating to the navigation function or generates a UI of a menu to be operated by the user. The HMI application 26 of a video system generates a UI for video such as DVD or television or generates a UI of a menu by which the user operates this function. The HMI application 27 of an audio system generates a UI relating to an audio function such as radio or television sound or generates a UI of a menu to be operated by the user. The vehicle-related HMI application 28, for example, generates a UI for the user to operate the functions relating to vehicle control that uses position information or a UI for displaying the alarm signals or messages.

The UI control application 22 may control the display of UT generated by the UI application 29 of each function. For example, the control may be performed such that only the UI of a predetermined function is displayed over the entire screen of the display, or all the UI are divided and displayed on the display, or only the UI of a predetermined function is not displayed.

An HMI-API 24, which is a layer located between the UI control application 22 and UI application 29 for each function, represents the API for the UI application 29 of each function to call out a functional logic 23. For example, where the user inputs an operation with respect to a predetermined UI application 29, the operated UI application 29 calls out the API corresponding to the operation with respect to the HMI-API 24, and the HMI-API 24 calls out the predetermined functional logic 23 according to the called-out API.

The functional logic 23 is a navigation logic 23a, a video system logic 23b, an audio system logic 23c, and a vehicle-related logic 23d. The logic is used for each function of the ECU 200. Where the UI application 29 for each function and functional logic 23 are thus separated, the degree of freedom in development is increased. For example, it is possible to change only the UI, while leaving the functional logic 23 as is.

Figure 4:
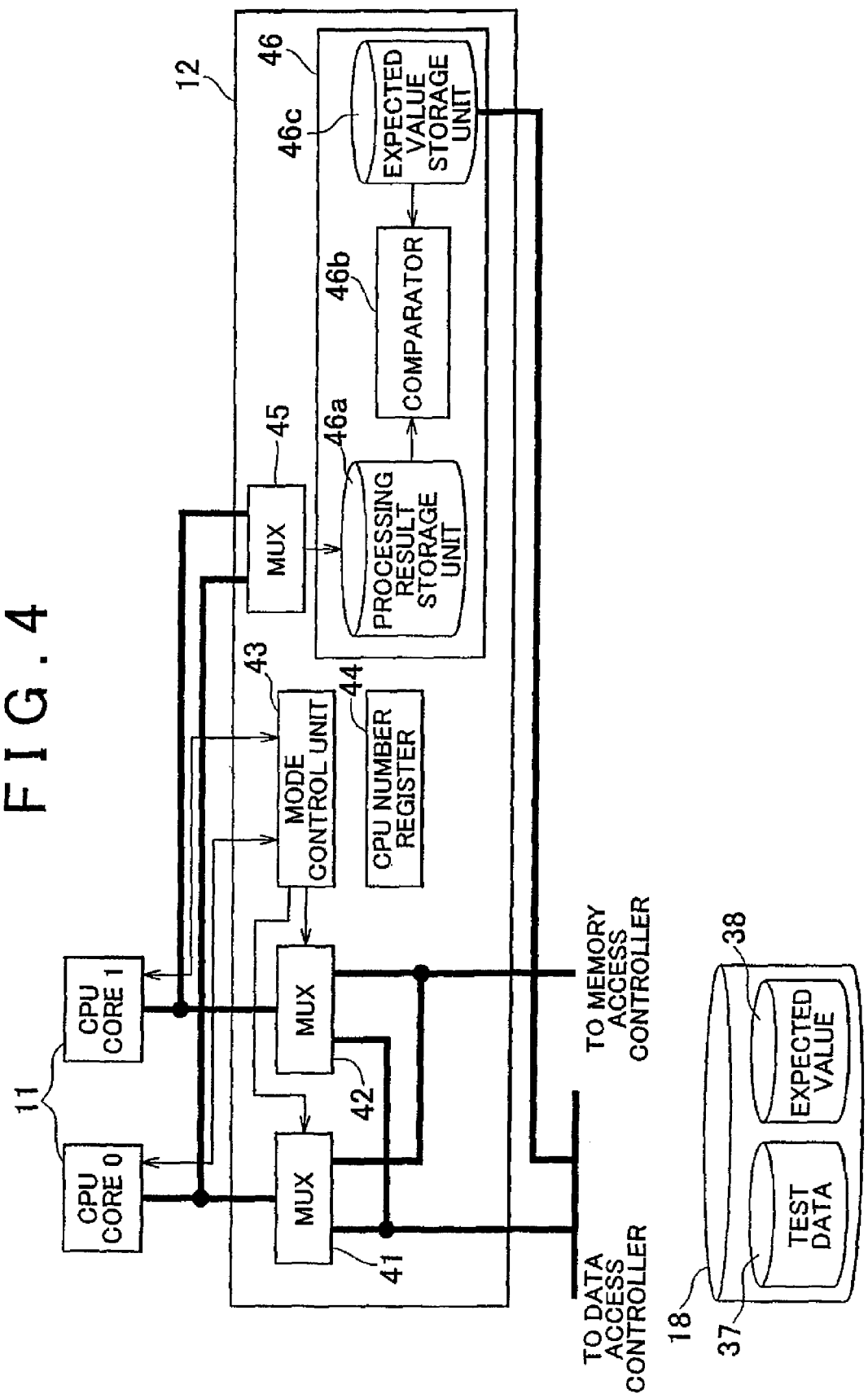
FIG. 4 illustrates an example of a configuration diagram of the data control unit according to the second embodiment of the invention.

The data control unit 12 will be described below with reference to FIG. 4. The data control unit 12 has three multiplexers (MUX) 41, 42, and 45, a mode control unit 43, a CPU number register 44, and a comparison block 46. The CPU core 0 is connected to the MUX 41, and the CPU core 1 is connected to the MUX 42. The MUX 41 is connected to both the data access controller 14 and the memory access controller 15. The MUX 42 is also connected to both the data access controller 14 and the memory access controller 15. The mode control unit 43 is connected to the MUX 41, MUX 42, CPU core 0, and CPU core 1. The MUX 45 is connected to the CPU core 0 and CPU core 1. The MUX 45 is also connected to the comparison block 46.

The mode control unit 43 switches the processing modes of the CPU core 0 and CPU core 1. Thus, the mode control unit 43 switches the CPU core 0 to the AMP mode, while leaving the CPU core 1 in the SMP mode, and switches the CPU core 1 into the AMP mode, while leaving the CPU core 0 in the SMP mode. More specifically, for example, a "High" signal is inputted in the CPU core 11 that is to be switched to the AMP mode. In this case, the internal switch of the CPU core 11 that has been switched to the AMP mode is switched ON/OFF to form a connection line or a logic circuit designated for failure diagnosis. The logic circuit for failure diagnosis may complete the failure diagnosis within a short time, for example, by making it possible to obtain the processing results of failure diagnosis in several blocks.

Further, the CPU core 0 that has been switched to the AMP mode outputs the processing results to the MUX 45, and the CPU core 1 that has been switched to the AMP mode outputs the processing results to the MUX 45. Thus, the processing results only from the CPU core 11 in the AMP mode are inputted in the MUX 45.

The mode control unit 43 also switches the processing modes of the MUX 41 and 42. The MUX 41 and 42 output an access request to the memory access controller 15 in the SMP mode and output an access request to the data access controller 14 in the AMP mode. As a result, in a case where the CPU core 0 is switched to the AMP mode, the mode control unit 43 switches the MUX 41 to the AMP mode and leaves the MUX 42 in the SMP mode. More specifically, the mode control unit 43 inputs, for example, a "High" signal to the MUX 41. Likewise, in a case where the CPU core 1 is switched to the AMP mode, the mode control unit 43 switches the MUX 42 to the AMP mode and leaves the MUX 41 in the SMP mode. More specifically, the mode control unit 43 inputs, for example, a "High" signal to the MUX 42.

The MUX 45 inputs the processing results inputted from the CPU core 11 in the AMP mode in the comparison block 46. The comparison block 46 has a processing result storage unit 46a that stores the processing results, a comparator 46b, and an expected value storage unit 46c. The processing result storage unit 46a stores the processing results. The expected value storage unit 46c stores the expected value 38 of the processing result, that is, the correct processing result. The expected value 38 is stored in advance in the external memory 18, and where the OS 21 switches either of the CPU cores 11 to the AMP mode, the OS 21 reads the expected value from the external memory 18 to the expected value storage unit 46c. The processing result storage unit 46a and expected value storage unit 46c are constituted, for example, by a dynamic random access memory (DRAM) or a register, and are not necessary physically separated. The comparator 46b compares the processing result of the processing result storage unit 46a with the expected value 38 of the expected value storage unit 46c and determines whether the results match. For example, when the results match, a "High" signal is outputted. It is also possible to determine whether either of the processing result and expected value 38 is below a predetermined threshold. The determination result is a failure diagnostic result.

A CPU number register 44 is a register that stores an identification number of the CPU core. For example, the mode control unit 43 stores in the CPU number register 44 the identification number of the CPU core 11 that is next to be subjected to failure diagnosis. The mode control unit 43 increments the CPU number register 44 each time the failure diagnosis of one CPU core 11 is completed. Further, where the "NUMBER—1" of the CPU cores 11 installed in the multicore CPU 13 is reached, the storage contents of the CPU number register 44 returns to "0". As a result, a plurality of CPU cores may be uniformly subjected to failure diagnosis, instead of conducting failure diagnosis of the same CPU core 11.

Figure 6A:
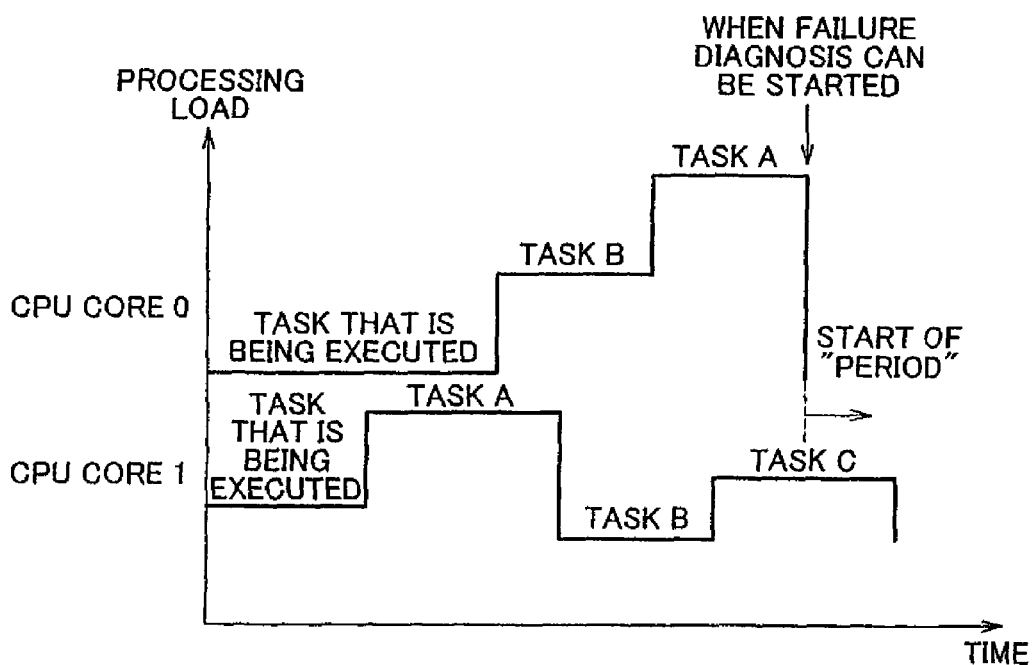
FIGS. 6A and 6B illustrate schematically an example of the load prediction according to the second embodiment of the invention.
Figure 6B:
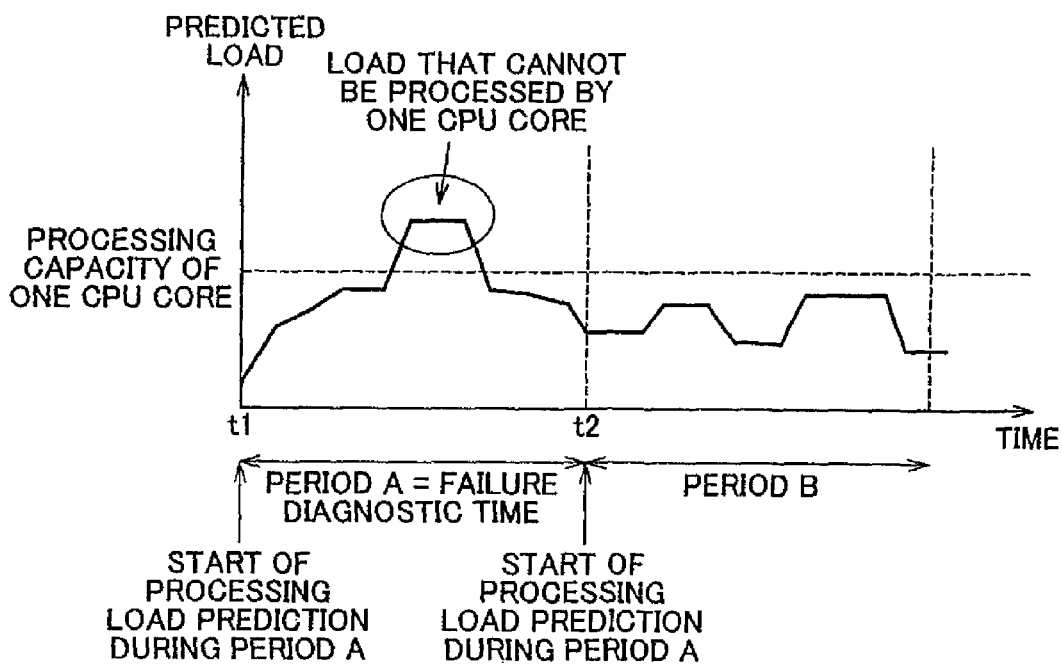

FIG. 5 shows an example of a functional block provided by the OS 21. FIGS. 6A and 6B show examples of explanatory drawings illustrating schematically the load prediction. The OS 21 (for example, a scheduler) allocates the tasks A to C to the CPU cores 11, while referring to the processing load of the CPU cores 11. In FIG. 5, the tasks B, A are registered in a task cue 31 of the CPU core 0, and the tasks A to C are registered in a task cue 32 of the CPU core 1. Therefore, the future processing load may be predicted by referring to the task cues 31, 32.

The load prediction unit 34 stores a table 33 in which the tasks are associated with Million Instructions PerSecond (MIPS)) values. For example, the task A is a program that issues 1,000,000 instructions per 1 sec, and has a processing load higher than that of other tasks B and C. The processing load of the CPU core 11 tends to be higher with the task with a high MIPS value. The load prediction unit 34 reads the task that is being executed in the CPU core 11 and the tasks of the task cues 31, 32, reads the MIPS value from the table 33, and predicts the processing load of the multicore CPU 13. FIG. 6A shows an example illustrating the prediction of temporal changes in the processing load of the CPU core 11. In a combination-type system, the application has already been known in advance and, therefore, the MIPS value may be specified for each task of the application.

A time in future to which a load is to be predicted (an interval from the present time at which the load is predicted to the future time will be referred to hereinbelow as "a period") is a time necessary to execute at least the task of failure diagnosis. The task of failure diagnosis corresponds to the test data 37 or to the execution of the test data 37. This is because the CPU core 11 that has executed the task of failure diagnosis returns to standard processing, without any effect being produced on the execution speed of standard processing, unless the processing load of the multicore CPU 13 exceeds the processing load of the CPU core 11 before the execution of the task of failure diagnosis is completed. The longest period is about 1 sec, and taking into account the overhead such as switching from the SMP mode to the AMP mode and reading of test data 37 and the like, the period may be assumed to be completed within less than 1 sec to several seconds.

As shown in FIG. 6A, with consideration for the completion time of each task, where the processing loads of CPU cores 11 overlap, it is possible to obtain FIG. 6B that predicts the processing load of the multicore CPU 13. With a typical OS 21, such a processing load is stationary monitored and a processing is executed such that allocates the tasks preferentially to the CPU core 11 with empty task cues 31, 32. Therefore, it is preferred that the prediction of load produce no effect of standard processing. Although the prediction of load may be assumed as an additional processing for the multicore CPU 13, because such a prediction of processing load may be performed by specifying a task from the tasks that are being executed and task cues 31, 32 and matching the MIPS value, the prediction of processing load does not become a load that affects the standard processing.

As shown in FIG. 6B, where the relationship between the processing load of the multicore CPU 13 and time is obtained, the load prediction unit 34 determines whether the processing load of the period exceeds the processing capacity of the CPU core 11 (here, the CPU core 1) that continuously executes the standard processing in the SMP mode. Because the processing capacity of the CPU cores 11 is already known and may be also represented by a MIPS value, the comparison may be easily made.

As shown in FIG. 6B, the processing load of a period A is determined to exceed the processing load of the CPU core 1, but the processing load of a period B is determined not to exceed the processing load of the CPU core 1. Therefore, the task of failure diagnosis of the CPU core 0 is executed from a point of time t2 in which the period A ends (referred to hereinbelow as "time when failure diagnosis may be started"). The processing capacity of the CPU cores 11 that is compared with the predicted processing load is a sum total of processing capacities of all the remaining CPU cores 11 that do not undergo failure diagnosis. Therefore, for example, in a case where the number of CPU cores 11 is four, the sum total of processing capacities of three CPU cores 11 is an object of comparison with the predicted processing load.

However, in a case where tasks are present that have already been allocated to the task cues 31, 32, the failure diagnosis is supposed to be conducted after all these tasks have been executed. In this case, the period is assumed to start at a time at which the tasks of the CPU cores 11 that are the object of failure diagnosis are completed. Therefore, the processing load that has to be predicted also becomes the processing load of the period. Thus, in a case where the CPU core 0 undergoes failure diagnosis, the time at which the final task A of the task cue 31 is completed in the CPU core 0 becomes the start point of the period, as shown in FIG. 6A. More specifically, it is possible that the failure diagnosis may be started each time the "period" elapses since the start point. The load prediction unit 34 predicts a processing load of the task C and subsequent tasks executed by other CPU core 1 from the time the task A is completed (task C is shown in FIG. 6B, but the task that is executed by the CPU core 1 when the CPU core 0 ends the task A changes depending on the execution time of each task by the CPU core 1).

Where the task that has once been allocated to the task cue 31 may be allocated again, the load prediction unit 34 may find a period in which the processing load of the multicore CPU 13 does not exceed the processing capacity and may allocate again the task that has been allocated to the CPU core 0 to the CPU core 1 that is not the object of failure diagnosis within this period.

Where the load prediction unit 34 finds a period in which the failure diagnosis is possible, the load prediction unit notifies the mode switching unit 35 about the time at which the failure diagnosis may be started. Where the time at which the failure diagnosis may be started is reached, the mode switching unit 35 (actually, the CPU core 11) outputs a control signal to the mode control unit 43 of the data control unit 12. As a result, as described hereinabove, the data control unit 12 switches the processing modes of the CPU core 11 and MUX 41, 42 in order to execute the task of failure diagnosis.

The CPU core 11 switched to the AMP mode by the mode control unit 43 executes the task of failure diagnosis. Thus, the CPU core 11 realizes the failure diagnostic unit 36 by executing the task of failure diagnosis. FIGS. 7 to 10 illustrate one example in which the operations of the data control unit 12 when the CPU core 11 is switched to the AMP mode.

FIG. 7 shows the data control unit 12 immediately after the mode switching unit 35 has outputted a control signal to the mode control unit 43. In FIG. 7, components identical to those shown in FIG. 4 are assigned with same reference numerals and explanation thereof is omitted. Where the mode control unit 43 refers to the CPU number register 44 and detects "0", the mode control unit switches the CPU core 0 and MUX 41 to the AMP mode. As a result, the MUX 41 may access the data access controller 14, and the CPU core 0 may access the MUX 45.

Figure 8:
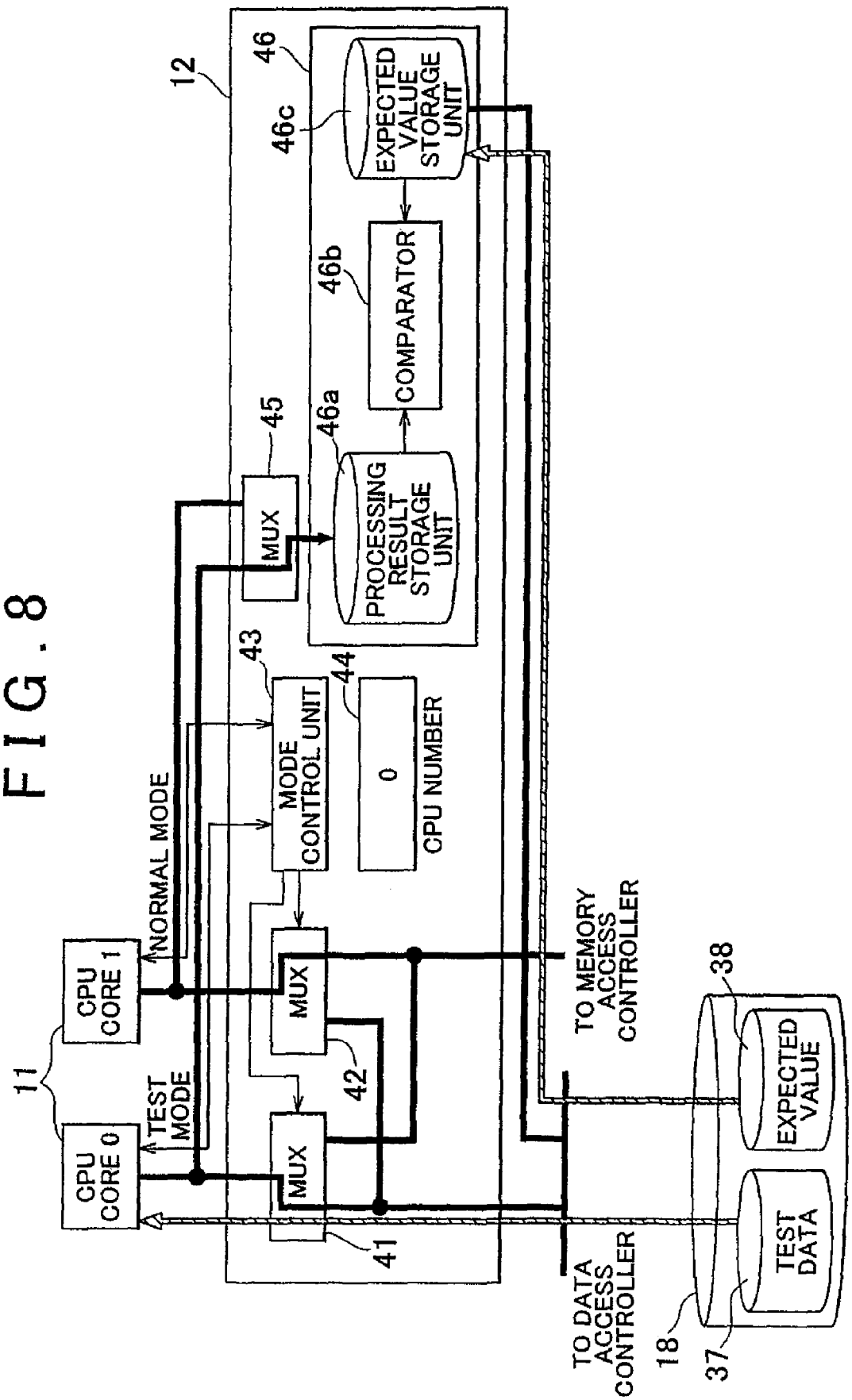
FIG. 8 explains a flow of data when the CPU core 0 according to the second embodiment of the invention reads the test data of failure diagnosis and expected value.

FIG. 8 illustrates a flow of data when the CPU core 0 reads out the test data 37 of failure diagnosis and expected value 38. The CPU core 0 that has been switched to the AMP mode requests the data access controller 14 to read the test data 37 and expected value 38 from the external memory 18 via the MUX 41. As a result, the CPU core 0 caches the test data 37 and sets the address of the test data 37 into the register. Further, the data access controller 14 directly reads Direct Memory Access (DMA) the expected value 38 from the external memory 18 into the comparison block 46.

The test data 37 may be appropriate data that may be inputted into the microcomputer 100 so as to enable the failure diagnostic unit 36 to use for failure diagnosis the instructions identical to those of the standard processing. Thus, where the expected value 38 that is the processing result obtained when the test data 37 are executed in the normal CPU core 11 is known, any test data 37 may be used. It is preferred that the test data 37 be limited to minimum necessary data, because the time necessary for the failure diagnosis (the aforementioned "period") may be minimized.

The test data 37 including instructions may be also used for the failure diagnosis. The test data 37 in this case are instructions (opcodes) and minimum necessary parameters (operands) for determining whether the CPU core 11 is normal. Simple instructions and parameters processed by an operational circuit for expanded function or Arithmetic and Logical Unit (ALU) of the CPU core 11 are used.

Figure 9:
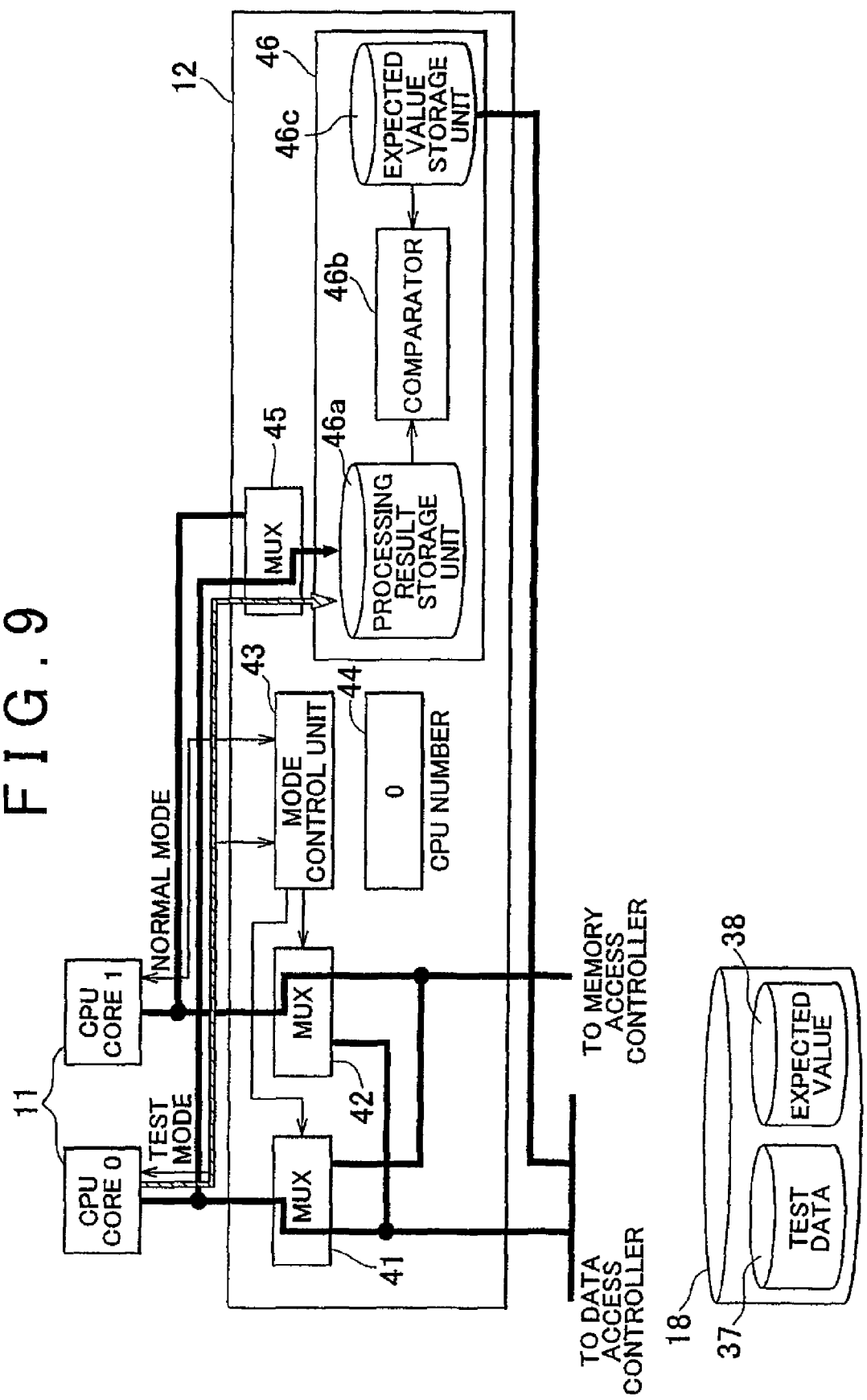
FIG. 9 illustrates a flow of data after the CPU core 0 according to the second embodiment of the invention has executed the test data of failure diagnosis.

FIG. 9 illustrates a flow of data after the CPU core 0 has executed the test data 37 of failure diagnosis. Where the test data 37 are executed, the CPU core 0 outputs the processing result to the MUX 45. The MUX 45 stores the processing result in the processing result storage unit of the comparison block 46. In this case, the expected value 38 and processing result may be inputted in the comparator 46b, and the comparator 46b compares the two and holds the comparison result or outputs it to the data access controller 14. The data access controller 14 stores the comparison result in the external memory 18. The comparison result obtained in comparing the expected value 38 and processing result may be outputted to the external memory 18 only when the processing result differs from the expected value. In this case, the execution time of the failure diagnostic task may be shortened.

The CPU core 1 executes the standard processing during the failure diagnosis, but because the data control unit 12 accesses the external memory 19 or IP via the data bus 17, the increase in bus load caused by the failure diagnosis does not affect the execution speed of standard processing.

Figure 10:
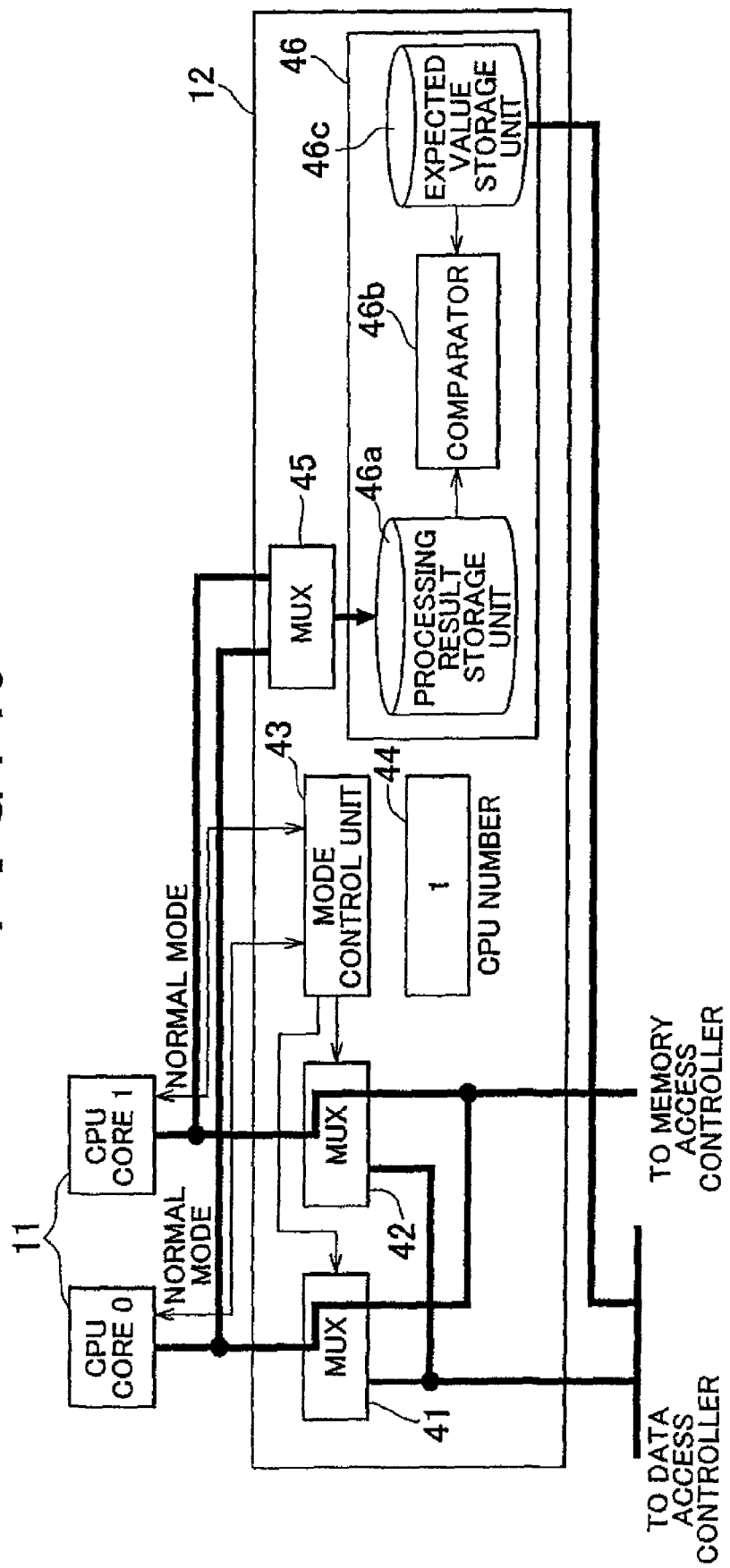
FIG. 10 shows a data control unit at completion of diagnostic processing according to the second embodiment of the invention.

FIG. 10 shows the data control unit 12 at the time the failure diagnosis is completed. The mode control unit 43 increments the value of the CPU number register 44 immediately after the processing mode of the CPU core 0 has been switched. Therefore, the value of the CPU number register 44 becomes "1". As a result, the CPU core 1 executes the task (test data 37) of the next failure diagnosis.

Figure 11A:
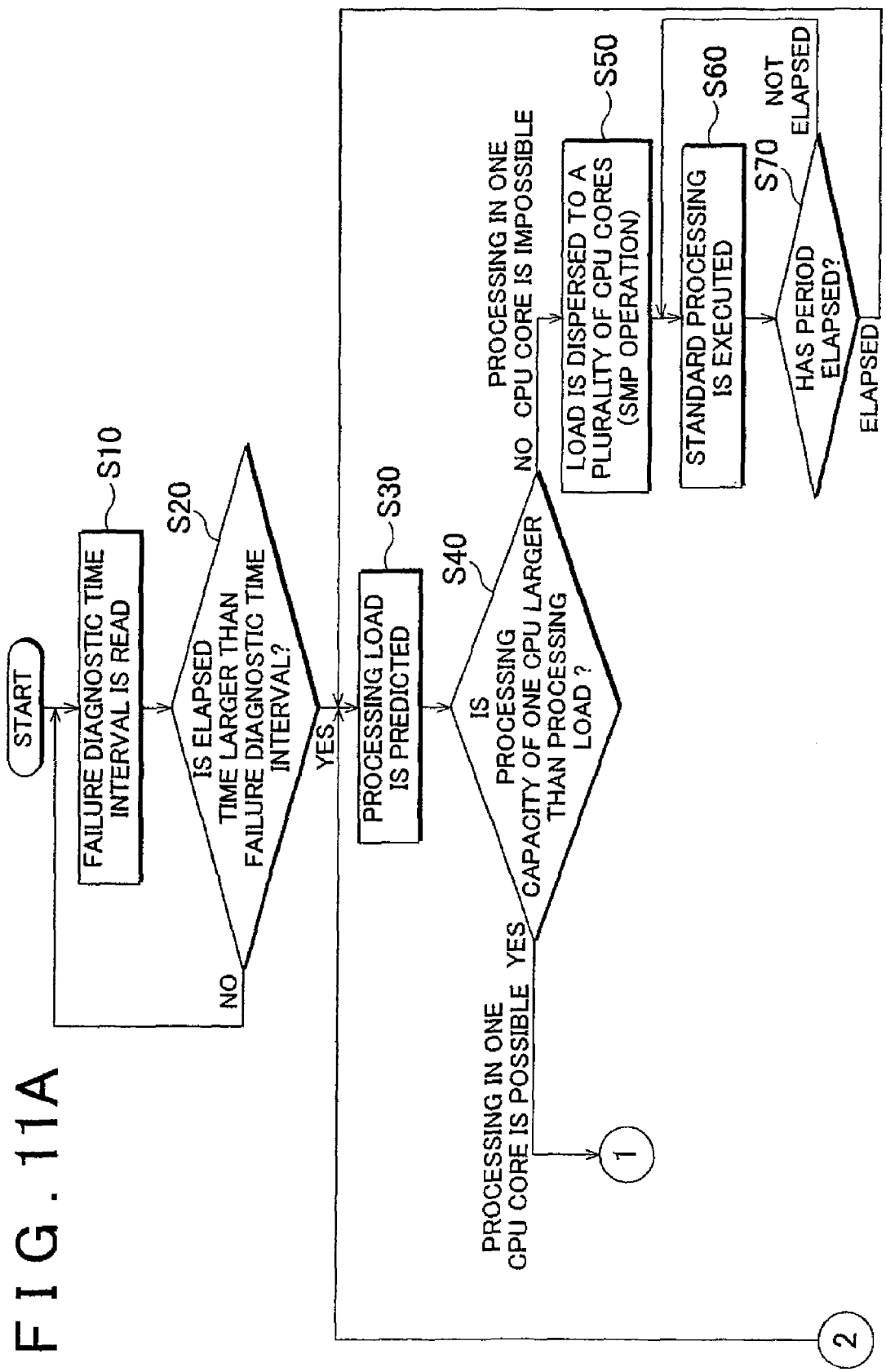
FIG. 11A and FIG. 11B is an example of a flowchart illustrating the procedure in which the microcomputer according to the second embodiment of the invention conducts failure diagnosis for each CPU core.
Figure 11B:
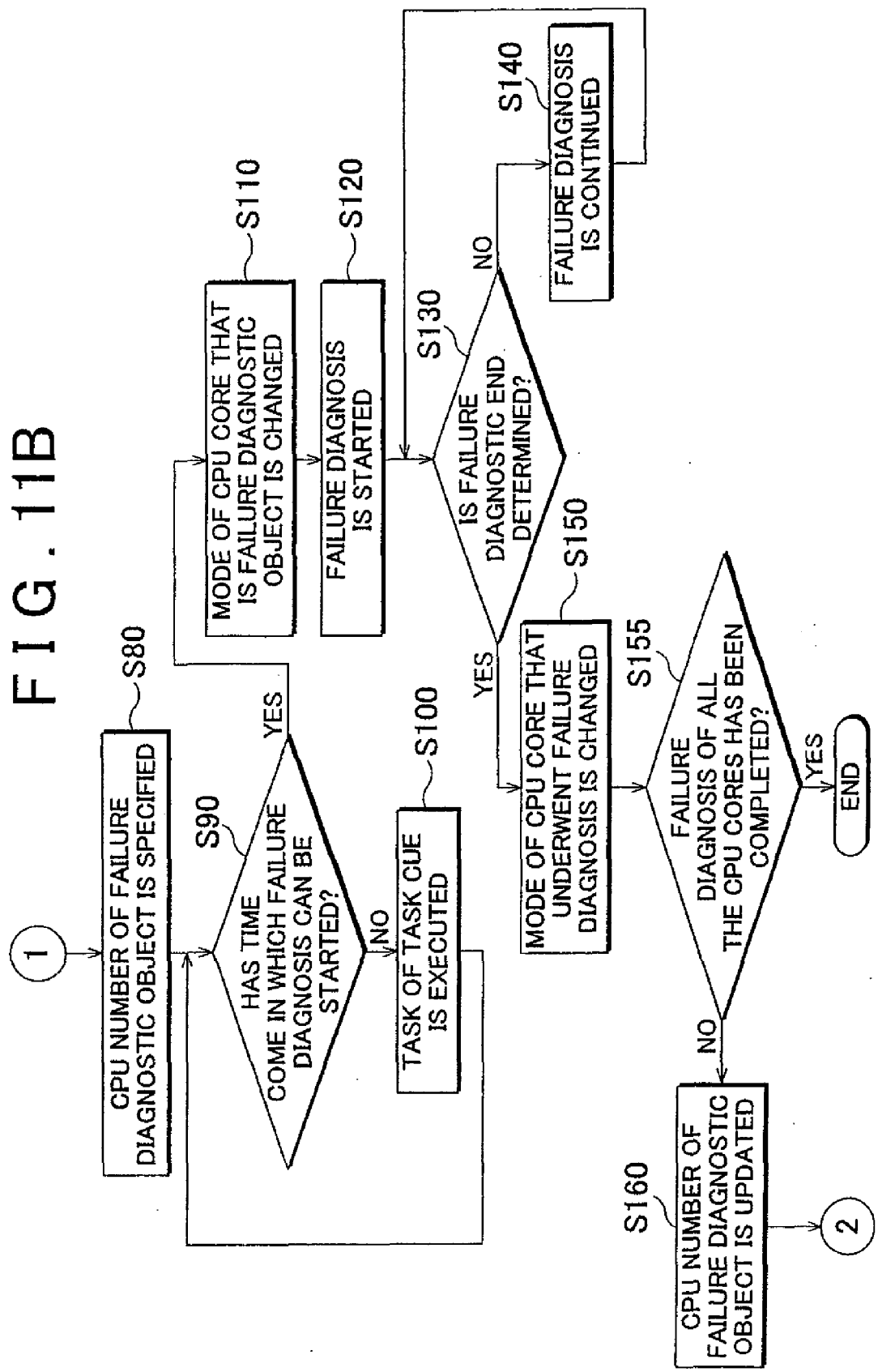

FIG. 11A and FIG. 11B shows an example of a flowchart illustrating a procedure of failure diagnosis conducted by the microcomputer 100 with respect to each CPU core. In FIG. 11A and FIG. 11B, the CPU core 0 is considered as an object of failure diagnosis.

Failure diagnosis is not required to be executed that frequently. For example, even if a failure may occur due to degradation with time, it is suffice to conduct failure diagnosis with a frequency of about once a day. For this purpose, the OS 21 stores day-time information relating to the very last failure diagnosis. The procedure shown in FIG. 11A and FIG. 11B is started, for example, when a time equal to or longer than a failure diagnostic time interval (for example, one day) elapses since the very last failure diagnosis, with reference to the day-time information, for each ignition ON. When the one day is taken as the failure diagnostic time interval, the failure diagnosis may be conducted with at least a one-day interval when the vehicle is operated. The day-time information is stored in association with the CPU core in the external memory 18, and a diagnostic interval may be set for each CPU core.

Where the ignition is switched ON and the OS 21 is actuated, the OS 21 reads the day-time information and failure diagnostic time interval from the external memory 18 (S10) and compares the time that has elapsed before the present point in time and the failure diagnostic time interval (S20). In a case where the elapsed time exceeds the failure diagnostic time interval (Yes in S20), the load prediction unit 34 is caused to predict the processing load (S30).

The load prediction unit 34 specifies the CPU core 0 that is the object of failure diagnosis from the value of the CPU number register 44. The load prediction unit 34 predicts the end time of the very last task allocated to the task cue 31 of the CPU core 0 and predicts the processing load of each period from the end time (S30).

Whether the processing load exceeds the processing capacity of the CPU core 1 is then determined for each period (S40).

In a case where the processing capacity of the CPU core 1 exceeds the processing load (No in S40), the execution speed of standard processing may be affected. Therefore, the mode switching unit 35 does not switch the CPU core 0 to the AMP mode. As a result, the OS 21 disperses the load between all the CPU cores 0 and CPU cores 1 in the SMP mode (S50) and continues standard processing (S60).

The load prediction unit 34 waits for the passage of the period in which the processing load has been predicted (S70), and once the period elapses, returns to step S30 and again predicts the load.

In a case where the processing capacity of one CPU core 1 is greater than the processing load in step S40 (Yes in S40), the mode switching unit 35 specifies the CPU core 0 that is the object of failure diagnosis from the value of the CPU number register 44 (S80). The mode switching unit 35 receives the time at which the failure diagnosis may be started from the load prediction unit 34.

The mode switching unit 35 waits till when the failure diagnosis may be started (S90). The CPU core 0 that is the object of failure diagnosis executes the task that has been allocated to the task cue 31 still in the SMP mode till when the failure diagnosis may be started (S100). The processing load may be predicted again immediately before the time at which the failure diagnosis may be started.

When the time comes at which the failure diagnosis may be started, the mode switching unit 35 requests that the data control unit 12 switch the processing mode of the CPU core 0 (S110). As a result, the mode control unit 43 of the data control unit 12 switches the CPU core 0 from the SMP mode to the AMP mode and switches the processing mode of the MUX 41 from the SMP mode to the AMP mode.

In this case, the CPU core 0 that has been switched to the AMP mode starts failure diagnosis (S120). As described above, the CPU core 0 reads the test data 37 from the external memory 18 and realizes the failure diagnostic unit 36, and the data access controller 14 reads the expected value from the external memory 18 to the expected value storage unit 46c.

The failure diagnostic unit 36 determines whether the diagnosis has been completed (S130). Whether the diagnosis has been completed may be determined, for example, based on whether the diagnosis has been executed before the very end of test data 37 or whether the comparator 46b has outputted the comparison result. In a case where the failure diagnosis has not been completed (No in S130), the failure diagnostic unit 36 continues executing the test data 37 in the AMP mode (S140).

In a case where the failure diagnosis is completed (Yes in S130), the failure diagnostic unit 36 requests the mode switching unit 35 to switch the processing mode. As a result, the mode switching unit 35 requests the data control unit 12 to switching the processing mode of the CPU core 0, and the mode control unit 43 of the data control unit 12 switches the CPU core 0 from the AMP mode to the SMP mode and switches the processing mode of the MUX 41 from the AMP mode to the SMP mode (S150).

Further, the mode control unit 43 increments the value of the CPU number register 44 (S160), when the CPU core whose diagnosis has not been completed is present (S155). As a result, the number of CPU core that is next to be subjected to failure diagnosis is set to "1" in the CPU number register 44.

The failure diagnosis of one CPU core 0 is thus completed. Therefore, the processing flow returns to step S30, and the OS 21 executes failure diagnosis of the CPU core 1. Failure diagnosis of all the CPU cores 11 may be executed, for example, for each ignition ON by repeating the above-described procedure the number of times equal to the number of CPU cores in the multicore CPU 13.

In a case where a failure of the CPU core 11 is detected, the multicore CPU 13 disconnects this CPU core 11 from the multicore CPU 13 and the standard processing may be executed only by the remaining CPU cores 11. In this case, although the processing capacity has decreased, the standard processing may be continued after the processing results of standard processing have been ensured. In this process, it is preferred that an important task with a high priority order be established and that only the established task, from among the standard processing tasks, be executed. A failsafe mode of the microcomputer 100 is thus possible and protection of the microcomputer from failure is increased.

Figure 12:
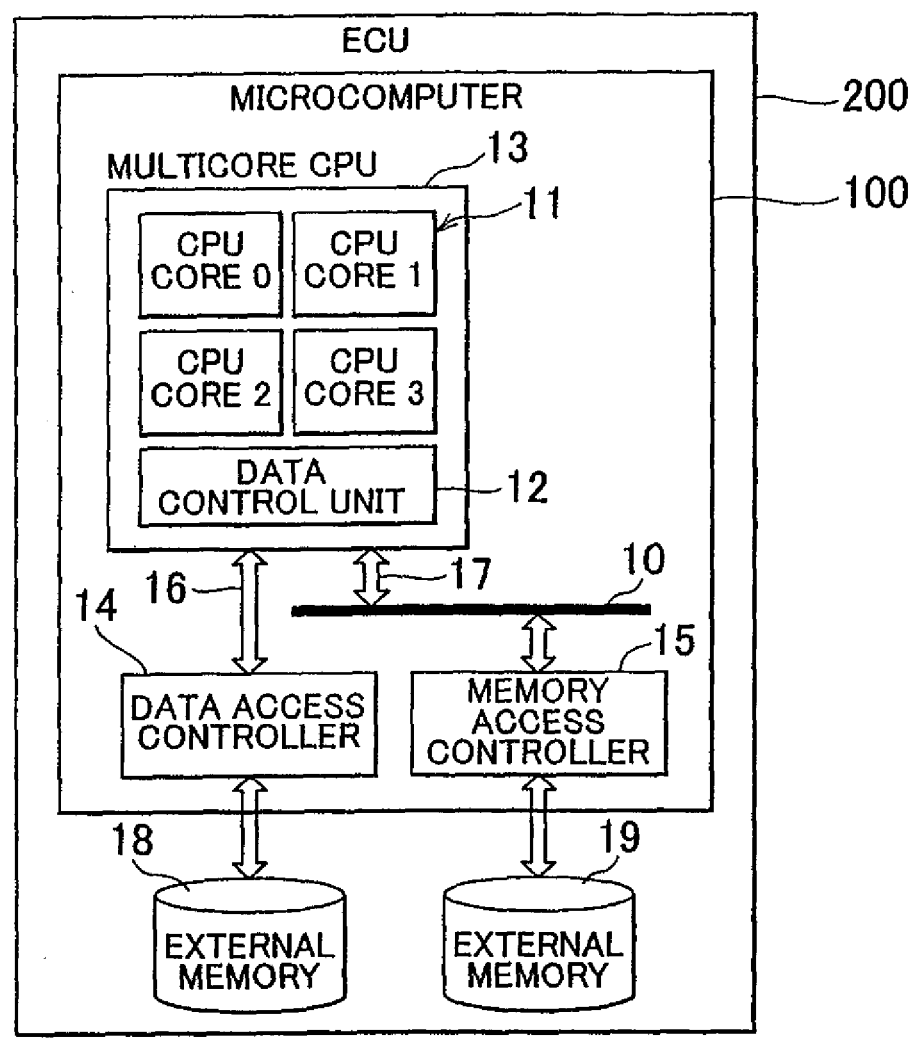
FIG. 12 shows an example of a block-diagram of the microcomputer having installed therein a multicore CPU having four CPU cores 0 to 3 according to the third embodiment of the invention.

The microcomputer 100 that uses the failure diagnosis explained in the first and second embodiments will be explained below as the third embodiment; FIG. 12 shows an example of a block diagram of the microcomputer 100 having installed therein the multicore CPU 13 having four CPU cores 0 to 3. In FIG. 12, the components identical to those shown in FIG. 2 are assigned with same reference numerals and explanation thereof is omitted.

Where one of two CPU cores 0 and 1 undergoes failure diagnosis, a large load is applied to the other CPU core 11. Therefore, the period in which the predicted processing load does not exceed the processing capacity of one CPU core 11 may be shortened, and in this case a time necessary for failure diagnosis sometimes may not be selected (by contrast, in a case where four CPU cores are present, the period in which the processing capacity is not exceeded is comparatively long, and therefore failure diagnosis is mostly possible). By contrast, even if one CPU core 11 from among the four CPU cores 0 to 3 undergoes failure diagnosis, the OS 21 disperses the load, while the three CPU cores 11 are still in the SMP mode. Therefore, the period may be easily detected. Thus, the failure diagnosis of the embodiment may be applied to any multicore CPU 13, regardless of the number of CPU cores 11.

In a case where the multicore CPU 13 has four CPU cores 11, as shown in FIG. 12, the CPU number register 44 of the data control unit 12 is used in a 2-bit configuration to make it suitable for the four CPU cores 11. Furthermore, a total of four MUX are provided at the data access controller 14 side of the data control unit 12, and each MUX is connected to the respective CPU cores 0 to 3. The MUX 45 and CPU cores 0 to 3 are respectively connected. The mode control unit 43 switches one of the CPU cores 0 to 3 and one (which corresponds to the one of the CPU cores 0 to 3) of the four MUX alternatively from the SMP mode to the AMP mode, thereby enabling the OS 21 to execute failure diagnosis of each CPU core 11.

The procedure of failure diagnosis is similar to that shown in FIG. 11A and FIG. 11B, and steps S10 to S160 may be repeated the number of times equal to the number of CPU cores 11. If it is possible to perform failure diagnosis of a plurality of CPU cores concurrently without affecting the execution speed of standard processing, failure diagnosis of a plurality of CPU cores may be performed concurrently.

Figure 13:
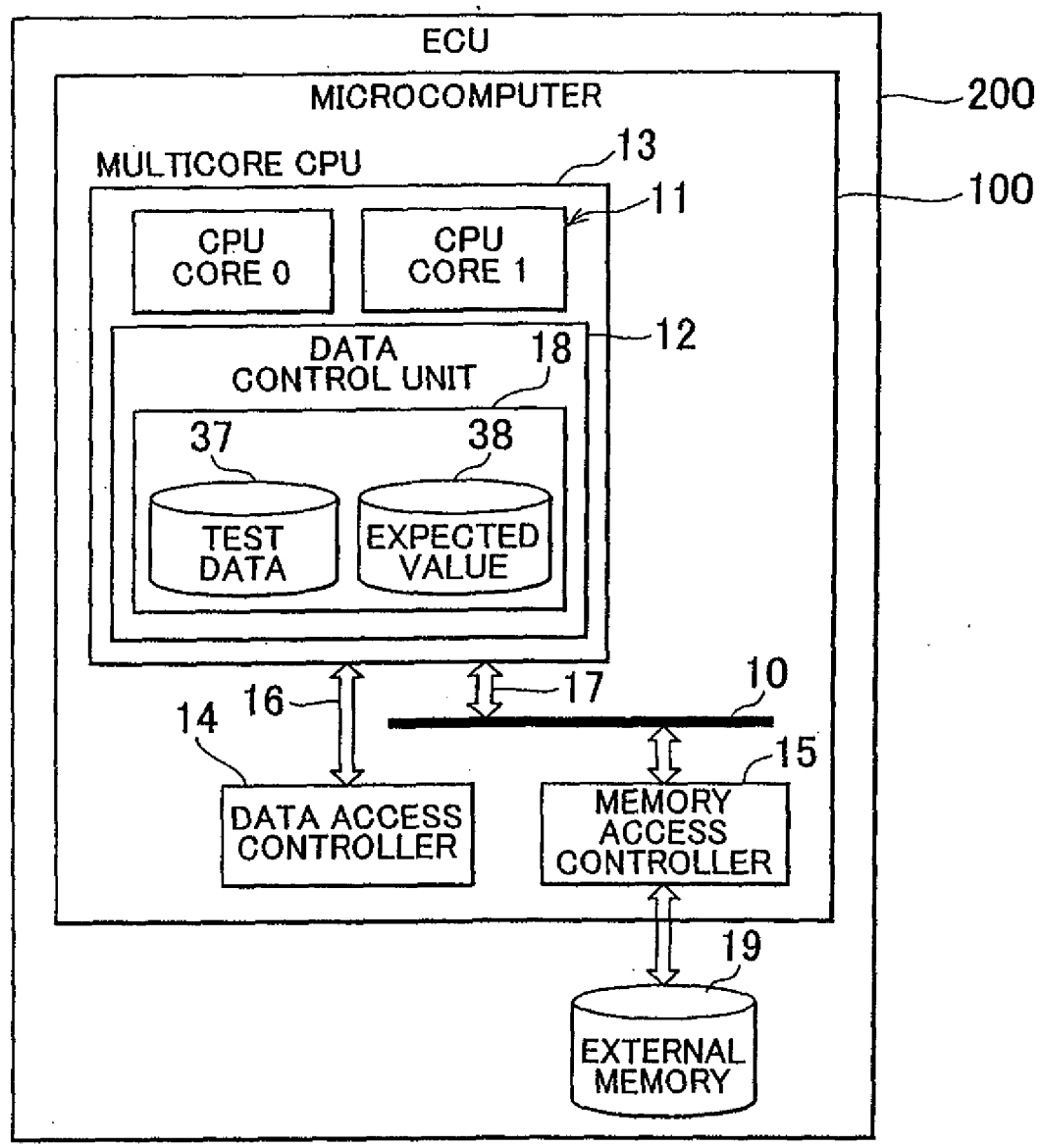
FIG. 13 is an example of a block-diagram of the microcomputer in which an external memory is provided in the data control unit according to the fourth embodiment of the invention.
Figure 14:
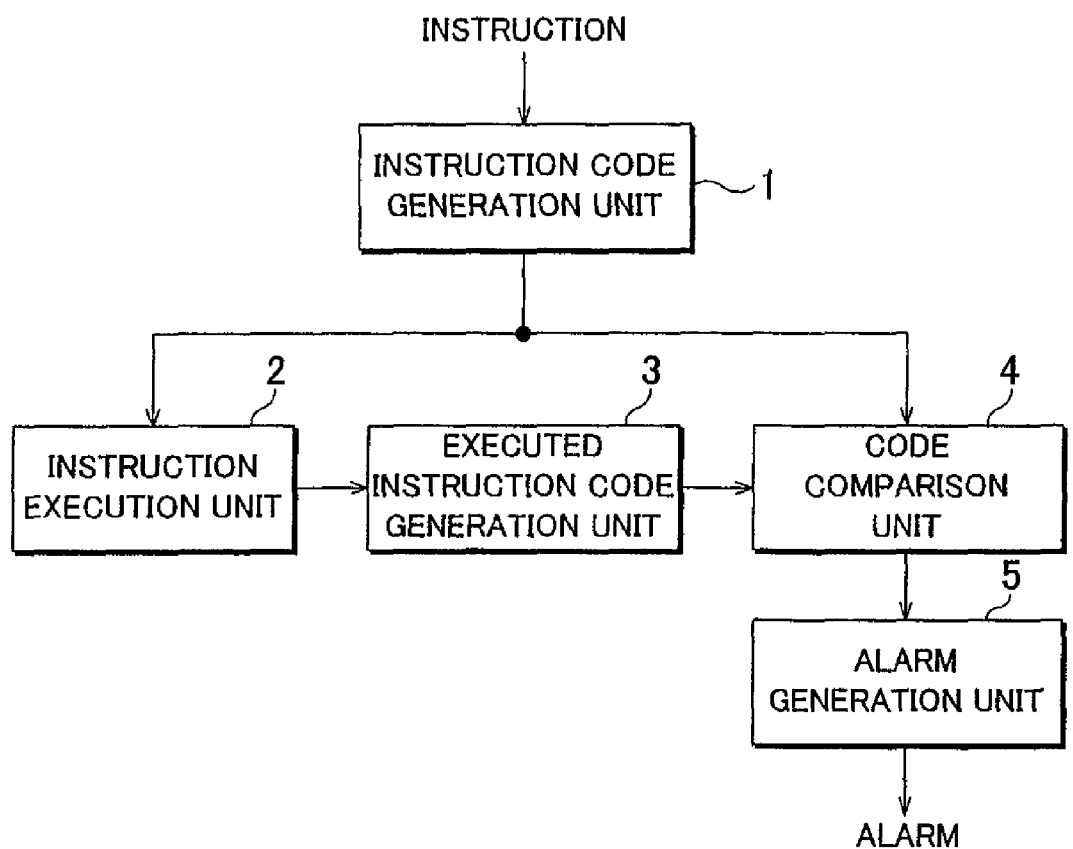
FIG. 14 is a block diagram of a processor that performs self-diagnosis according to the related art.

In the configuration shown in FIG. 2, the external memory 18 is externally attached to the microcomputer 100, but the external memory 18 may be also provided inside the microcomputer 100. FIG. 13 shows an example of a block-diagram of the microcomputer 100 of the fourth embodiment in which the external memory 18 is provided in the data control unit 12. In FIG. 13, the components identical to those shown in FIG. 2 are assigned with same reference numerals and explanation thereof is herein omitted. The test data 37 may be the same, regardless of the passage of time, and where the test data 37 are not changed, the expected value also may be the same.

Therefore, the external memory may thus be incorporated in the data control unit 12. In this case, it is not necessary for the data access controller 14 to read the test data 37 and expected values from the external memory 18, and the failure diagnostic time may be shortened. The external memory 18 incorporated in the data control unit 12 is in the form of Read Only Memory (ROM), Random Access Memory (RAM), electrically erasable programmable memory (EEPROM), or the like. In a case where a RAM is incorporated, data are, for example, read from the external memory 19 and stored in the RAM when the microcomputer 100 is started.

As described hereinabove, the microcomputer 100 of the embodiment may perform failure diagnosis individually for each CPU core 11 of the multicore CPU 13, without affecting the standard processing, by switching the CPU core 11 that is the object of failure diagnosis from the SMP mode to the AMP mode only when the standard processing may be executed without obstacles by the CPU cores 11 that are not the objects of failure diagnosis.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A failure diagnostic system for a multicore CPU having installed therein a plurality of CPU cores, said CPU cores being configured to be switched from a symmetric multiprocessing (SMP) mode to an asymmetric multiprocessing (AMP) mode, the system comprising:
    a load prediction section that predicts a processing load of the CPU cores;
    a mode switching section that switches at least one of the CPU cores to the AMP mode when the processing load is less than a threshold; and
    a failure diagnostic section that performs failure diagnosis of the CPU core that has been switched to the AMP mode.

2. The failure diagnostic system according to claim 1, wherein the load prediction sections predicts a processing load of the multicore CPU in a period required for the failure diagnostic section to conduct failure diagnosis.

3. The failure diagnostic system according to claim 2, wherein the load prediction section establishes the period that is started at a point of time in which a task executed by the CPU core to be switched to the AMP mode ends.

4. The failure diagnostic system according to claim 1, further comprising:
- a first data bus dedicated to the CPU core in the SMP mode;
- a second data bus dedicated to the CPU core in the AMP mode; and
- a data control section that connects the CPU core in the SMP mode to the first data bus and connecting the CPU core in the AMP mode to the second data bus.

5. The failure diagnostic system according to claim 4, wherein
- the data control section means has a plurality of multiplexor units connected to a plurality of the CPU cores respectively; and
- the mode switching section switches a connection destination of the multiplexor unit connected to the CPU core that has been switched to the AMP mode from the first data bus to the second data bus.

6. The failure diagnostic system according to claim 4, wherein the failure diagnostic section compares a processing results of test data for failure diagnosis with an expected value that has been stored in advance, and conduct failure diagnosis of the CPU core that has been switched to the AMP mode based on whether the processing results and the expected value are in conformity.

7. The failure diagnostic system according to claim 6, further comprising an external memory that stores the test data and the expected value, wherein
- the failure diagnostic section reads the test data and the expected value via the second data bus.

8. The failure diagnostic system according to claim 7, wherein a result of the comparison between the processing result of the test data and the expected value is stored in the external memory.

9. The failure diagnostic system according to claim 6, wherein the data control section stores the test data and the expected value.

10. The failure diagnostic system according to claim 1, wherein when the failure diagnostic section detects a failure of the CPU core, the CPU core is disconnected from the multicore CPU and tasks are distributed only to the remaining CPU cores that have not been diagnosed as having failed.

11. The failure diagnostic system according to claim 1, wherein the threshold of a processing load is set to a value such that a processing capacity of standard processing in the CPU core in the SMP mode does not decrease when the CPU core switched to the AMP mode undergoes failure diagnosis.

12. The failure diagnostic system according to claim 11, wherein the standard processing is a processing that requires real time execution ability.

13. The failure diagnostic system according to claim 1, further comprising a storage section that stores as information a time at which failure diagnosis has been performed, wherein
- the failure diagnosis is conducted again in a case where a time elapsed since the last failure diagnosis exceeds a predetermined time.

14. An electronic control unit for a vehicle, comprising:
- the failure diagnostic system according to claim 1;
- a navigation section;
- a video output section; and
- an audio output section.

15. A failure diagnostic method for a multicore CPU having installed therein a plurality of CPU cores, said CPU cores being configured to be switched from a symmetric multiprocessing (SMP) mode to an asymmetric multiprocessing (AMP) mode, the method comprising:
- predicting a processing load of the CPU cores;
- switching at least one of the CPU cores to the AMP mode when the processing load is less than a threshold; and
- failure diagnosing the CPU core that has been switched to the AMP mode.

* * * * *